(12) United States Patent
Fang et al.

(10) Patent No.: US 6,403,053 B1
(45) Date of Patent: Jun. 11, 2002

(54) PREPARATION OF TRANSLUCENT STRONTIUM BARIUM NIOBATE CERAMICS USING REACTION SINTERING

(75) Inventors: Tsang-Tse Fang; Wen-Jiung Lee, both of Tianan (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/183,901

(22) Filed: Oct. 30, 1998

(30) Foreign Application Priority Data

Dec. 15, 1997 (TW) .......................................... 86118872

(51) Int. Cl.$^7$ ............................................... C01B 13/14
(52) U.S. Cl. ...................................... 423/593; 501/135
(58) Field of Search ........................... 423/593; 501/135

(56) References Cited

U.S. PATENT DOCUMENTS

| 3,640,865 A | * | 2/1972 | Burns et al. |
| 4,187,109 A | * | 2/1980 | Megumi et al. |
| 4,283,752 A | * | 8/1981 | Layton |
| 5,445,806 A | * | 8/1995 | Kinugasa et al. |
| 5,552,355 A | * | 9/1996 | Cava et al. |
| 5,954,994 A | * | 9/1999 | Kimura et al. |

* cited by examiner

Primary Examiner—Steven P. Griffin
Assistant Examiner—Christina Ildebrando
(74) Attorney, Agent, or Firm—Pacific Law Group LLP; Chi Ping Chang

(57) ABSTRACT

In this patent, reaction sintering was used to prepare translucent strontium barium niobate ceramics ($Sr_xBa_{1-x}Nb_2O_6$, x=0.2–0.7). High purity powders of strontium carbonate ($SrCO_3$) and barium carbonate ($BaCO_3$) were mixed with niobium oxide ($Nb_2O_5$), respectively, at the same mole using ball milling. The mixed powders were dried and ground by a mortar. Thereafter, they were calcined at 800–1050° C. for 1–4 h in air to form strontium niobate ($SrNb_2O_6$) and Barium niobate ($BaNb_2O_6$), respectively. Precursor powders of strontium niobate ($SrNb_2O_6$) and barium niobate ($BaNb_2O_6$) were mixed in appropriate ratios and pressed. Compacts were reaction-sintered in a temperature range of 1300 to 1320° C. in $O_2$ and then heat-treated in a temperature range of 1260 to 1275° C. in $O_2$. We also propose the related basic principles and microstructures.

3 Claims, 5 Drawing Sheets

(1 of 5 Drawing Sheet(s) Filed in Color)

PREPARATION OF TRANSLUCENT STRONTIUM BARIUM NIOBATE CERAMICS USING REACTION SINTERING

FIELD OF THE INVENTION

The invention concerns a process for preparing translucent $Sr_xBa_{1-x}Nb_2O_6$, x=0.2–0.7, through the reaction sintering at temperatures in a range of 1300° C. to 1320° C., and subsequent low-temperature heat treatment at temperatures in a range of 1260° C. to 1275° C.

BACKGROUND OF THE INVENTION

General conventional solid-state reacton processes using high temperature (>1150° C.) calcination would make powders aggregated. During the sintering process, the aggregation creates nonuniform densification that results in the discontinuous grain growth, whereas pores are inclined to be trapped and remain inside the grain. Thus, high-density ceramic body cannot be obtained. According to the literature survey, there are two ways to achieve high-density strontium barium niobate ceramics, i.e., using sintering aid and applying external pressure. However, the former would deteriorate the properties and the latter is costly and would restrict the shape of ceramics.

On account of this, this invention proposes a method using reaction sintering without pressure to produce a translucent ceramic body of $Sr_xBa_{1-x}Nb_2O_6$, x=0.2–0.7.

DESCRIPTION OF THE PRIOR ART $Sr_xBa_{1-x}Nb_2O_6$, $0.25 \leq x \leq 0.75$, has a tetragonal tungsten bronze structure; R. R. Neurgaonkar et al., 1988 *Ferroelectrics*, Vol. 87, pp.167, thought that when a substance is non-centric ferroelectricity, it can be applied to electro-optical and pyroelectric device. Linear electro-optical coefficient and pyroelectric coefficient are the reference elements in the design of electro-optical and pyroelectric components. Among all electro-optical materials, R. R. Neurgaonkar et al., 1987, *Opt. Eng.*, Vol. 26, pp.392, reported that single crystal $Sr_xBa_{1-x}Nb_2O_6$ is endowed with the highest linear electro-optical coefficient. Furthermore, in 1969, A. M. Glass in *J. Appl. Phys.*, Vol. 40, pp.4699–713 stated that single crystal $Sr_xBa_{1-x}Nb_2O_6$ possesses higher pyroelectric coefficient. Consequently, this material has became the invention subject for many scientists. Since the material was discovered in 1967, K. Megumi et al., in 1976 *J. Mat. Sci.* Vol. 11, pp.1583, reported that the growing technology and property of single crystal $Sr_xBa_{1-x}Nb_2O_6$ have been widely invented, and some products are used in industries. However, in actual application, single crystal is still subjected to limits such as shape, size, mechanical strpength, and price, etc. Thus, developing $Sr_xBa_{1-x}Nb_2O_6$ ceramic is an essential trend as its preparation procedure is simpler and easier to control, and mass production of complicated shape is feasible, which would reduce product cost and adds application value.

For translucent electro-optical ceramic, the light permeable quality is closely related to its microstructure. The pores, impurity, and grain boundary will create light scattering or barrier, which would in turn affect its transparency. Consequently, manufacturing translucent sintered sample of high density and uniform grain is critical for obtaining a fine electro-optical ceramic. For $Sr_xBa_{1-x}Nb_2O_6$ of tetragonal tungsten bronze structure, on account of difficult in controlling microstructure and achieving high density, there has been little report on the manufacture of transparent $Sr_xBa_{1-x}Nb_2O_6$ as of present, and only 3 reports claimed that the test samples were able to reach 99% theoretical density.

1. In 1981, K. Nagaka et al. in *Ferroelectrics*, Vol. 38, pp.853, reported that hot-pressing method can be used to achieve density close to 99% theoretically: however, microstructure is sensitive to the pressure direction, and the thickness of the sample produced is smaller than 0.2 mm for translucency.
2. In 1988, S. I. Lee et al. in *Ferroelectrics*, Vol. 87, pp. 209, used Li or La as sintering aid to achieve high density. Despite which, additive will affect its property, and the thickness of the sample produced is smaller than 0.2 mm for translucency.
3. In 1991, N. S. Van Damme et al., in *J. Am. Ceram. Soc.*, Vol. 74, Issue 8, pp. 1785, reported two-step treatment, i. e., presureless-sintered and then hot-isostatic pressing sinter to produce $Sr_xBa_{1-x}Nb_2O_6$ ceramic of high density and translucency. Such manufacturing procedure is rather complex, and the cost of instrumentation and equipment is very expensive. However, the thickness of the samples produced is smaller than 1 mm for translucency.

In summarizing the three reports above, it can be derived that, when using conventional single-phase sintering method to produce $Sr_xBa_{1-x}Nb_2O_6$, an external pressure or additives may be required to prevent the abnormal grain growth. Moreover, as the ratio of Sr/Ba increases, the temperature for synthesizing single-phase $Sr_xBa_{1-x}Nb_2O_6$ must also be elevated, resulting in powder aggregation, which is not good for subsequent sintering. Thus, means of reducing agglomeration as well as producing small and uniform powders remain to be the precepts of deriving a ceramic of high-density and uniform microstructure.

SUMMARY OF THE INVENTION

The invention proposes a method of reaction sintering to produce translucent $Sr_xBa_{1-x}Nb_2O_6$. The primary intent of this invention is to present a new production technology, in which $SrNb_2O_6$ and $BaNb_2O_6$ powders were synthesized at lower temperature (950° C.), as an improvement comparing with the conventional signal-phase sintering which requires calcination of single-phase $Sr_xBa_{1-x}Nb_2O_6$ powders over 1150° C. that has the drawback of serious aggregation. When the two powders are mixed in appropriate ratio and sintered in oxygen, the new method is able to achieve microstructure of high density (close to 99% theoretical density) and uniform size.

The manufacturing method according to the invention comprises taking equal mole weight of $SrCO_3$ and $BaCO_3$ to mix with $Nb_2O_5$ powders by ball-milling, respectively. The two types of mixed powders are ground when dry, and synthesized in air at a temperature range of 800 to 1050° C. for 1 to 4 hours to produce $SrNb_2O_6$ and $BaNb_2O_6$. After mixing approximate amount of $SrNb_2O_6$ and $BaNb_2O_6$, the mixture is pressed into green compact, which is then subject to reaction sintering in oxygen under 1300 to 1320° C., followed by 12 hours heat treatment in a temperature range of 1260 to 1275° C. in for the production of translucent $Sr_xBa_{1-x}Nb_2O_6$.

ADVANTAGE OF INVENTION

1. The process can be derived from sintering in constant pressure without application of hot pressing or hot-isostatic pressing, which reduces cost.
2. High density can be achieved at a lower temperature (1300° C.), and the microstructure can be more easily controlled and less likely to have abnormal grain growth.

BRIEF DESCRIPTION OF THE DRAWINGS

The file of this patent contains at least one drawing executed in color. Copies of this patent with color drawings (s) will be provided by the Patent and Trademark Office upon request and payment of the necessary fees.

The accompanying drawings, which are incorporated in and constitute a part of the specification, illustrate presently preferred embodiments of the invention and, together with the general description given above and the detailed description of the preferred embodiments given below, serve to explain the principles of the invention.

DETAIL DESCRIPTIONS OF THE INVENTION

Figure 1:
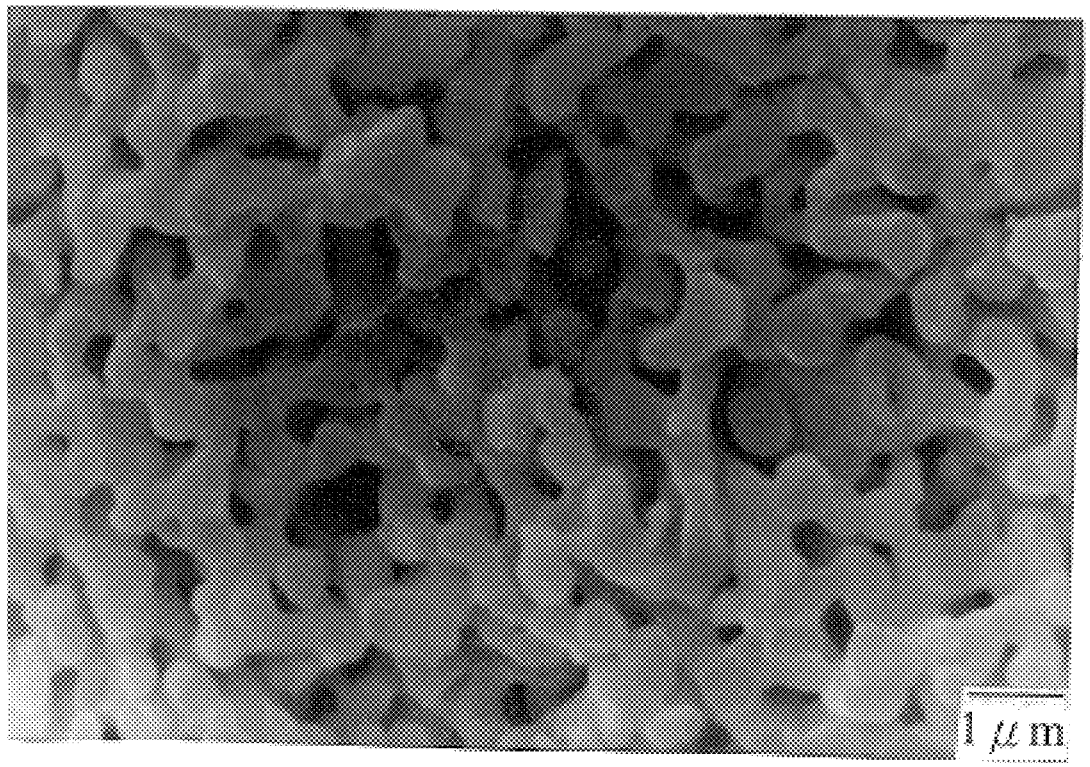
FIG. 1: Dissected view of microstructure of $Sr_{0.5}Ba_{0.5}Nb_2O_6$ composed in Example 1, sintered in 1225° C.

This invention concerns the manufacturing method of a type of transparent $Sr_xBa_{1-x}Nb_2O_6$. Taking equal mole weight of $SrCO_3$ and $BaCO_3$ to mix with $Nb_2O_5$ powders by ball-milling, respectively. The two types of mixed powders are ground when dry, and synthesized in air at a temperature range of 800 to 1050° C. for 1 to 4 hours for the production of $SrNb_2O_6$ and $BaNb_2O_6$. After mixing approximate amount of $SrNb_2O_6$ and $BaNb_2O_6$, this mixture is pressed into green compact, which is then subject to reaction sintering in oxygen under 1300 to 1320° C., followed by 12 hours of heat treatment in a temperature range of 1260 to 1275° C. in oxygen for the production of translucent $Sr_xBa_{1-x}Nb_2O_6$, $x=0.2-0.7$.

When using the manufacturing method of reaction sintering in producing transparent $Sr_xBa_{1-x}Nb_2O_6$, $x=0.2-0.7$ based on $SrNb_2O_6$ and $BaNb_2O_6$, $x=0.2-0.7$, the reaction will inhibit densification, and restrain the grain coarsening when temperature rises. Thus, after the reaction, the compact will retain the uniform and fine grain microstructure, and the pore distribution shall be very uniform and narrow. Therefore, densification rate would be enhanced at high temperature (after reaction), which enables the production of high sintered density and very uniform microstructure in 25° C. lower temperature. It is also discovered that sintered in oxygen atmosphere, the final density will be increased to near 99% theoretical density, and that the microstructure of which is uniform. Moreover, it is also found that the low-temperature heat treatment at 1260 to 1275° C. in oxygen after reaction sintering would be the key process for achieving the near 99.5% theoretical density.

The invention proposes using reaction sintering to produce $Sr_xBa_{1-x}Nb_2O_6$, and the process steps are as follows:

1. Weigh equal moles of $SrCO_3$ and $Nb_2O_5$ powders of 99.99% purity, add water, and ball-mill for 24 hours. The powders and water weight ratio above is 1:2. When the mixed powders are dried, grind and calcine powders at 800 to 1050° C. in air for 1 to 4 hours to form $SrNb_2O_6$.

2. Weigh equal moles of $BaCO_3$ and $Nb_2O_5$ powders of 99.99% purity, add water, and ball-mill for 24 hours. The powders and water weight ratio above is 1:2. When the mixed powders are dried, grind and calcine powders at 800 to 1050° C. in air for 1 to 4 hours to form $BaNb_2O_6$.

3. Take appropriate amounts of $SrNb_2O_6$ and $BaNb_2O6$, and mix; the ratio shall be based on the $Sr_xBa_{1-x}Nb_2O_6$, $x=0.2$ to 0.7, desired to produce. The mixture shall be dried by microwave rapidly. Grind and use 30 MPa for initial low pressure shaping, then cold-isostatic press at 200 Mpa to make high green density and uniform compact.

4. The reaction sintering condition for the proposed method is to sinter in oxygen at 15° C./min to temperatures of 1300 to 1320° C. The holding time is determined by sintering temperature and composition. After reaction sintering, samples are then heat-treated at 1260 to 1275° C. in oxygen for 12 hours.

This invention applied reaction sintering to prepare $Sr_xBa_{1-x}Nb_2O_6$. When synthesizing $SrNb_2O_6$ and $BaNb_2O_6$ as described above, the temperature is in the range of 800 to 1050° C.; 950° C. is better. For calcining at temperatures exceeding 950° C., more aggregation occurs, but below 950° C., complete synthesis of $SrNb_2O_6$ and $BaNb_2O_6$ cannot be achieved. The synthesizing time is in the range of 1 to 4 hours, and 2 hours is better. For over 2 hours, more agglomeration occurs, and under 2 hours, complete syntheses of $SrNb_2O_6$ and $BaNb_2O_6$ cannot be achieved.

Add water to mix appropriate amounts of $SrNb_2O_6$ and $BaNb_2O_6$ powders, and use microwave for fast drying. The reason for using microwave fast drying is to prevent the powder segregation during that process. The ratio for the two powders shall be based on the $Sr_xBa_{1-x}Nb_2O_6$, $x=0.2$ to 0.7, desired to produce. It is more ideal when x value is 0.2 and 0.6. The dried powders above shall be ground and pressed at 30 MPa low pressure for initial shaping. If the pressure is under 30 MPa, strength of the green compact is weak. Moreover, axial pressing will create nonuniform pressure distribution in a compact.

Along with the increase of cold-isostatic pressing (CIP), the density of sample will be increased. However, when the pressure is higher than 200 Mpa, density enhancement is limited, and the powders will become rigid. Thus the cold-isostatic pressing shall be based on 200 Mpa.

The reaction sintering condition for the proposed method is to sinter in oxygen at 15° C./min to temperatures of 1300 to 1320° C. The holding time is determined by sintering temperature and composition. After reaction sintering, samples are then further heat-treated at 1260 to 1275° C. in oxygen. If the sintering temperature is lower than 1300° C., the theoretical density will not reach 99%, and if the temperatures higher than 1320° C., there is no significant increase of density, but discontinuous grain growth is more likely to occur. Consequently, uniform microstructure will not be achieved. The holding time is determined by the sintering temperature; 0.2 to 0.5 hour is more ideal. Oxygen is the preferred sintering atmosphere. The reason is that both air and nitrogen contain nitrogen that is not beneficial for continuing shrinkage of pore, making it not possible to achieve the 99% theoretical density. The sintered sample is further heat-treated at 1260 to 1275° C. in oxygen atmosphere; this shall obtain a nearly transparent sample. If the temperature of heat treatment is higher than 1275° C., the abnormal grain growth is more likely to occur which leads to non-uniform microstructure. If the temperature is lower than 1260° C., the grain growth is slower, and the range of 1260 to 1275° C. is more ideal. Ceramics of greater transparency can be derived when the holding time is longer than 6 hours. Choose appropriate heat treatment temperatures and times within the range according to the transparency of the test sheet required. The main purpose of heat treatment is to enable uniform grain growth. Moreover, the atmosphere poses no significant effects, therefore, nearly transparent ceramic can be produced in the atmosphere of oxygen, air or nitrogen. For process of convenience and consistency, oxygen atmosphere used for the previous step of reaction sintering, is used also in the heat treatment.

An actual example is given below for illustrating the invention's manufacturing method and product effect; provided that the scope of the invention as applied herein shall not be limited to the example as used below.

EXAMPLE 1

Weigh $SrCO_3$ and $Nb_2O_5$ high purity powders of 99.99%, add water, and mix for 24 hours by ball mill. The powders and water weight ratio is 1:2. When the mixed powders are dried, grind into powder and calcine at 950° C. in air for 2 hours to form $SrNb_2O_6$. Follow the same procedure above, and weigh $BaCO_3$ and $Nb_2O_5$ high purity powders of 99.99%, add water, and mix for 24 hours by ball mill. The powders and water weight ratio above is 1:2. When dried, grind into powder and calcine at 950° C. in air for 2 hours to form $BaNb_2O_6$.

Take appropriate amounts of $SrNb_2O_6$ and $BaNb_2O_6$, at the ratio of, 0.5/0.5 and mix. The mixture shall be dried by microwave rapidly. Grind and use 30 MPa for initial low pressure shaping, and then cold-isostatic press at 200 MPa to obtain high density and uniform compact. Then sintered in oxygen at 15° C./min to 1300° C. for 0.5 hour, and followed by heat-treated at 1275° C. in oxygen for 12 hours in deriving translucent $Sr_{0.5}Ba_{0.5}Nb_2O_6$.

EXAMPLE 2

Follow the procedures as described in Example 1, and take $SrCO_3$ and $BaCO_3$, to mix with $Nb_2O_5$ mix for 24 hours by ball mill, respectively. When dried, grind into powders and calcine at 950° C. in air for 2 hours to form $SrNb_2O_6$ and $BaNb_2O_6$, respectively.

Take appropriate amounts of $SrNb_2O_6$ and $BaNb_2O_6$, at the ratio of 0.5/0.5 and mix. The mixture shall be dried by microwave rapidly. Grind and use 30 MPa for initial low pressure shaping, and then cold-isostatic press at 200 Mpa to obtain high density and uniform compact. Then sintered in oxygen at 15° C./min to 1300° C. for 0.2 hour, followed by heat-treatment at 1275° C. in oxygen for 12 hours in deriving translucent $Sr_{0.6}Ba_{0.4}Nb_2O_6$, respectively.

Comparison Example

Follow the procedures as described in Example 1, and take $SrCO_3$ and $BaCO_3$, to mix with $Nb_2O_5$ powders for 24 hours by ball mill, respectively. When dried, grind into powder and calcine at 950° C. in air for 2 hours to form $SrNb_2O_6$ and $BaNb_2O_6$, respectively.

Take appropriate amounts of $SrNb_2O_6$ and $BaNb_2O_6$, at a ratio of 0.5/0.5, and add water to mix. The mixture shall be rapidly dried by microwave. Grind and use 30 MPa for initial low pressure shaping, then cold-isostatic press at 200 Mpa to obtain high density and uniform compact. Then sinter in oxygen at 15° C./min to 1225° C. for 0.5 hour for producing single-phase $Sr_{0.5}Ba_{0.5}Nb_2O_6$.

Function Example

Observe the microstructure and pore distribution of translucent $Sr_{0.5}Ba_{0.5}Nb_2O_6$ test sheet.

Figure 2:
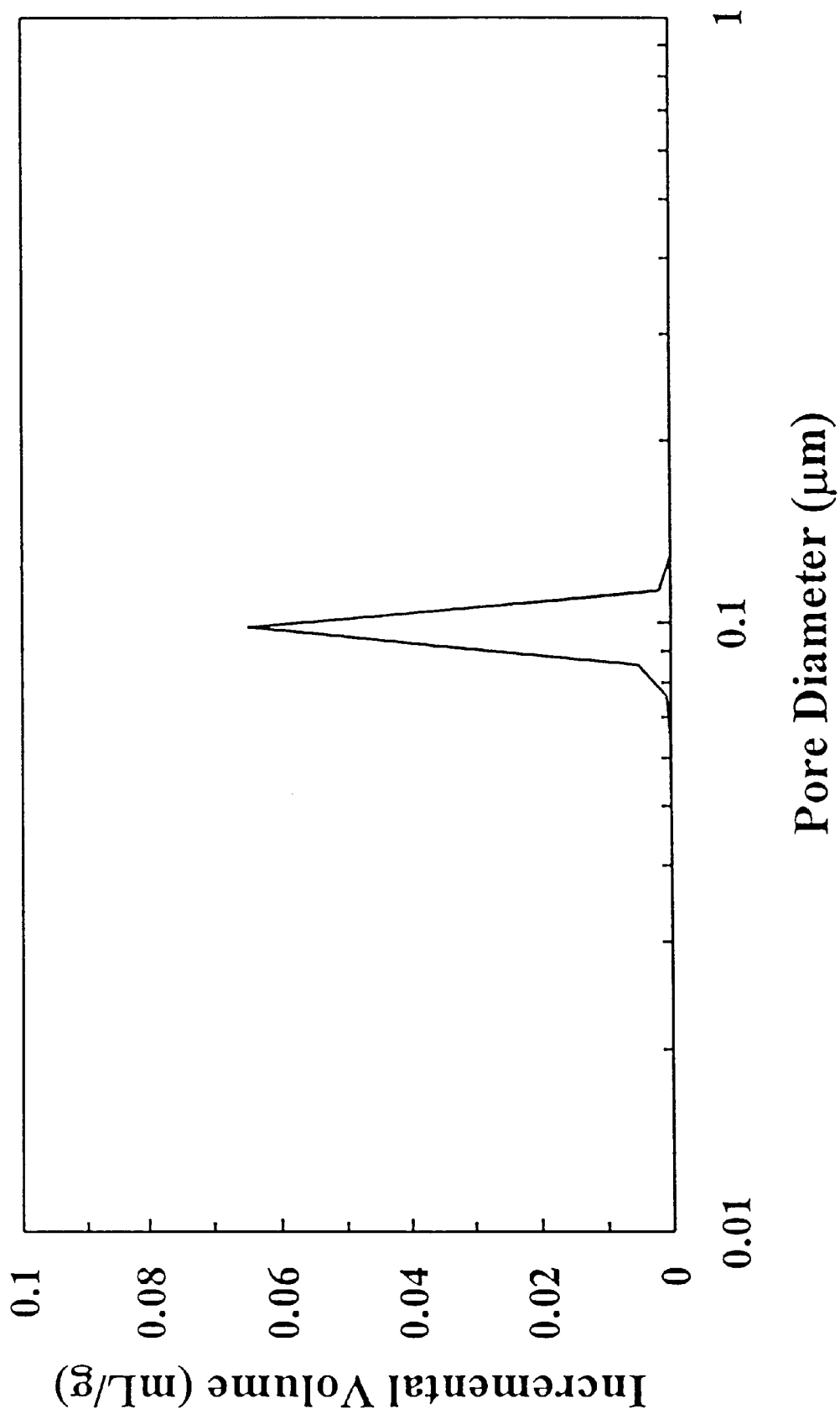
FIG. 2: Pore size distribution of the sample shown in FIG. 1 as measured by SEM.

Take the formed $SrNb_2O_6$ and $BaNb_2O_6$, at the ratio of 0.5/0.5 under the Comparison Example, and sinter in oxygen at 15° C./min to 1225° C. for 0.5 hour. The derived $Sr_{0.5}Ba_{0.5}Nb_2O_6$ retains fine microstructure as shown in FIG. 1. Use SEM to measure pore size and distribution proving that the pore distribution is very uniform as shown in FIG. 2.

Figure 3:
FIG. 3: Microstructure of $Sr_{0.5}Ba_{0.5}Nb_2O_6$ composed in Example 1, sintered at 1325° C. in oxygen for 0.5 hour.
Figure 4:
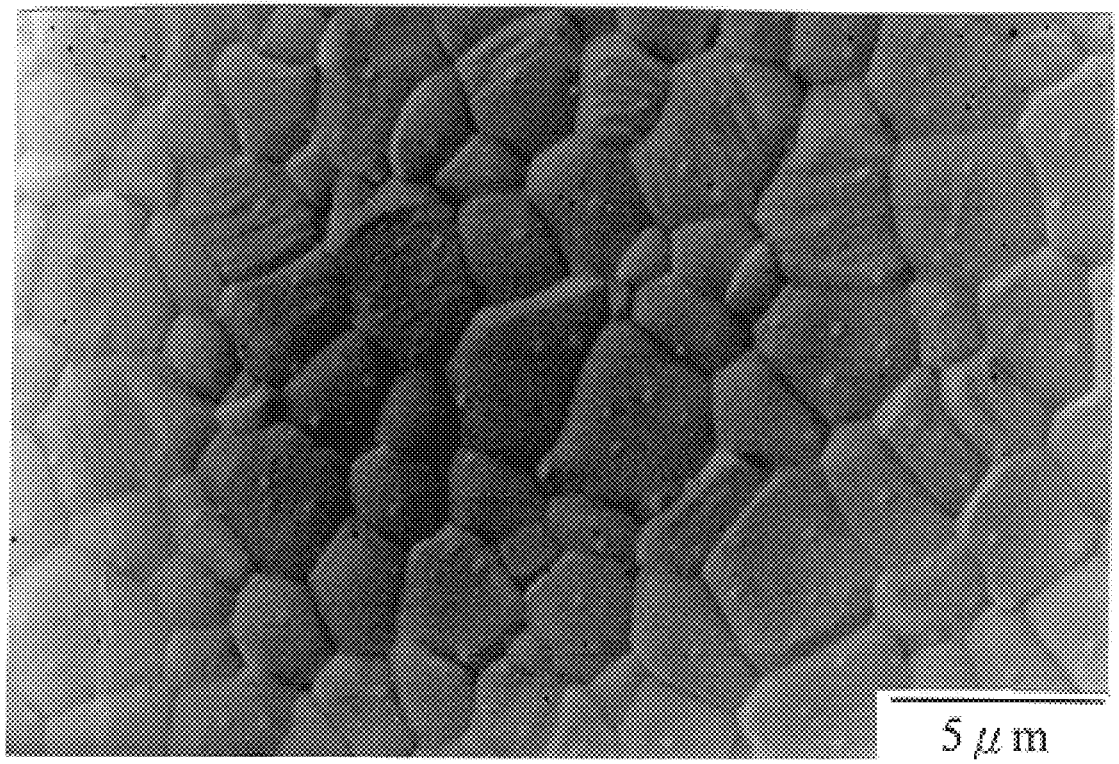
FIG. 4: Microstructure of the sample shown in FIG. 3 which is further heat-treated at constant temperature of 1275° C. in oxygen for 12 hours.

Take the formed $SrNb_2O_6$ and $BaNb_2O_6$, at the ratio of 0.5/0.5, and sintered in oxygen at 15° C./min to 1300° C. for 0.5 hour to achieve the relative density close to the 99% theoretical density. Once the said $Sr_{0.5}Ba_{0.5}Nb_2O_6$ test sheet is polished, then thermal-etched for 0.5 hour at the temperature lower than the sintering temperature by 100° C. Use SEM to observe the microstructure as shown in FIG. 3. Take the sintered sample and subject to heat treatment at 1275° C. in oxygen for 12 hours, and the density will be increased to the 99.5% theoretical density with a uniform microstructure. The microstructure of which is shown in FIG. 4.

Figure 5:
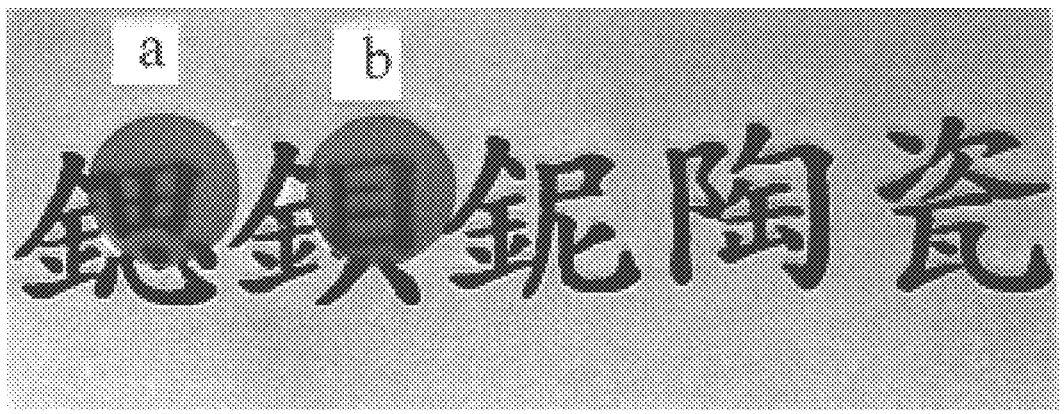
FIG. 5: Translucent sample of $Sr_{0.5}Ba_{0.5}Nb_2O_6$ composed in Example 1 and $Sr_{0.5}Ba_{0.5}Nb_2O_6$ composed in Example 2 produced through reaction sintering and heat treatment.
  a. $Sr_{0.5}Ba_{0.5}Nb_2O_6$ ceramic
  b. $Sr_{0.6}Ba_{0.4}Nb_2O_6$ ceramic

FIG. 5 features the photograph taken of $Sr_{0.5}Ba_{0.5}Nb_2O_6$ ceramic produced through the procedures as described under Example 1 wherein the diameter is 10 mm and thickness is 1.6 mm. The $Sr_{0.6}Ba_{0.4}Nb_2O_6$ ceramic as produced under Example 2, the diameter of which is 10 mm, and the thickness is 1.5 mm. Both results show the transparency of the specimens. The thickness is thicker, compared to results concern the translucent strontium barium biohate caramity published in the prior art. The thickness of general transparent test sheets is under 1 mm.

Although this invention application uses a better example to illustrate the theory; however, it should not be used in restraining the scope of this invention. Any individual acquainted with such technology, without straying from the spirit and scope of this invention, may be also to make certain modifications and enhancement. Consequently, the scope of this invention as applied for protection shall be based on the specification as made in the following.

What is claims is:

1. A method of manufacturing a translucent $Sr_xBa_{1-x}Nb_2O_6$, x=0.2–0.7, comprising the steps of:
    ball-milling equal weights of $SrCO_3$ and $BaCO_3$ separately with $Nb_2O_5$ powders to form a $SrCO_3/Nb_2O_5$ mixture and a $BaCO_3/Nb_2O_5$ mixture, respectively;
    calcining said $SrCO_3/Nb_2O_5$ mixture and said $BaCO_3/Nb_2O_5$ mixture in air at 800–1050° C. for 1–4 hours to produce $SrNb_2O_6$ and $BaNb_2O_6$;
    mixing and then pressing an amount of each of said $SrNb_2O_6$ and $BaNb_2O_6$ to form a pellet;
    sintering said pellet in oxygen at a temperature to form a sintered pellet; and
    isothermally heating the sintered pellet in oxygen for 12 hours at 1260–1275° C. to produce said translucent $Sr_xBa_{1-x}Nb_2O_6$.

2. The method of claim 1 wherein said pellet is sintered at a temperature of 1300 to 1320° C., for a period of 0.2 to 0.5 hours.

3. The method of claim 1 wherein said pressing step is performed under a low pressure at 30 MPa followed by a cold-isostatic pressing at 200 MPa.

* * * * *